United States Patent
Ross et al.

(10) Patent No.: US 11,611,881 B2
(45) Date of Patent: Mar. 21, 2023

(54) INTEGRATED SYSTEMS AND METHODS FOR PASSIVE AUTHENTICATION

(71) Applicants: Board of Trustees of Michigan State University, East Lansing, MI (US); Ford Global Technologies, LLC, Dearborn, MI (US)

(72) Inventors: Arun Ross, East Lansing, MI (US); Anil K. Jain, Okemos, MI (US); Debayan Deb, Okemos, MI (US); Kwaku O. Prakah-Asante, Commerce Township, MI (US); Krishnaswamy Venkatesh Prasad, Ann Arbor, MI (US)

(73) Assignees: Board of Trustees of Michigan State University, East Lansing, MI (US); Ford Global Technologies LLC, Dearborn, MI (US)

( * ) Notice: Subject to any disclaimer, the term of this patent is extended or adjusted under 35 U.S.C. 154(b) by 766 days.

(21) Appl. No.: 16/697,364

(22) Filed: Nov. 27, 2019

(65) Prior Publication Data

US 2021/0160687 A1    May 27, 2021

(51) Int. Cl.
```
H04W 12/30      (2021.01)
G06F 21/30      (2013.01)
G06N 3/08       (2023.01)
G06N 3/04       (2023.01)
H04W 12/06      (2021.01)
```

(52) U.S. Cl.
CPC .......... *H04W 12/30* (2021.01); *G06F 21/30* (2013.01); *G06N 3/0445* (2013.01); *G06N 3/08* (2013.01); *H04W 12/06* (2013.01)

(58) Field of Classification Search
CPC ....... H04W 12/30; H04W 12/06; H04W 4/40; G06F 21/30; G06F 21/31; G06F 21/316
USPC .......................................................... 726/19
See application file for complete search history.

(56) References Cited

U.S. PATENT DOCUMENTS

| | | | |
|---|---|---|---|
| 9,707,911 B1 | 7/2017 | Myers et al. | |
| 10,032,008 B2 | 7/2018 | Griffiths et al. | |
| 10,179,568 B2 | 1/2019 | Hariri et al. | |
| 10,250,611 B2 | 4/2019 | Herrmann et al. | |
| 10,841,292 B2 * | 11/2020 | Soon-Shiong | H04L 63/08 |

(Continued)

OTHER PUBLICATIONS

Debayan Deb et al., "Actions Speak Louder Than (Pass)words: Passive Authentication of Smartphone* Users via Deep Temporal Features", Jan. 16, 2019; https://arxiv.org/pdf/1901.05107.pdf.

*Primary Examiner* — Teshome Hailu
(74) *Attorney, Agent, or Firm* — Harness, Dickey & Pierce PLC

(57) ABSTRACT

A passive authentication method includes, in response to receiving a requested action from a first user, obtaining a set of sensor data and categorizing first sensor data of the set of sensor data into a first modality of a set of modalities. The method includes, for the first modality of the set of modalities, determining a distance value by applying a first modality model to the first sensor data and comparing the distance value to a first verified value of the first user for the first modality. The method includes, based on the comparison, determining a first authentication decision of the distance value. The method includes, in response to the first authentication decision indicating the first sensor data corresponds to the first user, performing the requested action.

16 Claims, 7 Drawing Sheets

(56) References Cited

U.S. PATENT DOCUMENTS

| | | | |
|---|---|---|---|
| 2010/0217457 A1* | 8/2010 | Georgi | G07C 9/00309 701/2 |
| 2012/0167170 A1* | 6/2012 | Shi | G06F 21/316 726/2 |
| 2013/0099940 A1* | 4/2013 | Protopapas | B60Q 9/00 701/1 |
| 2013/0311954 A1* | 11/2013 | Minkkinen | G06F 3/04812 715/862 |
| 2014/0039721 A1* | 2/2014 | Protopapas | B60Q 9/00 701/1 |
| 2015/0213244 A1* | 7/2015 | Lymberopoulos | G06F 21/32 726/19 |
| 2017/0192428 A1* | 7/2017 | Vogt | G05D 1/0257 |
| 2018/0082304 A1 | 3/2018 | Summerlin et al. | |
| 2018/0338229 A1* | 11/2018 | Nemec | B60W 30/181 |
| 2019/0242711 A1* | 8/2019 | Ingersoll | G01C 11/02 |
| 2021/0256191 A1* | 8/2021 | Ricci | H05K 3/0005 |

\* cited by examiner

INTEGRATED SYSTEMS AND METHODS FOR PASSIVE AUTHENTICATION

FIELD

The present disclosure relates to user authentication methods and more particularly to passive authentication methods using mobile computing devices.

BACKGROUND

Prevailing user authentication schemes on smartphones rely on explicit user interaction, where a user types in a passcode or presents a biometric cue such as face, fingerprint, or iris. In addition to being cumbersome and obtrusive to the users, such authentication mechanisms may pose security and privacy concerns.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A passive authentication method includes, in response to receiving a requested action from a first user, obtaining a set of sensor data and categorizing first sensor data of the set of sensor data into a first modality of a set of modalities. The method includes, for the first modality of the set of modalities, determining a distance value by applying a first modality model to the first sensor data and comparing the distance value to a first verified value of the first user for the first modality. The method includes, based on the comparison, determining a first authentication decision of the distance value. The method includes, in response to the first authentication decision indicating the first sensor data corresponds to the first user, performing the requested action.

In other aspects, the first verified value of the first user for the first modality is stored in a distance database, and the distance database includes a corresponding verified value of the first user for each modality of the set of modalities. In other aspects, the method includes, in response to the first authentication decision indicating the first sensor data does not correspond to the first user, requesting an additional authentication decision. In other aspects, the additional authentication decision includes requesting a password or biometric data.

In other aspects, comparing the distance value to the first verified value of the first user for the first modality includes determining a difference between the distance value and the first verified value of the first user. In other aspects, the method includes obtaining a first threshold corresponding to the first modality and authenticating the set of sensor data as the first user in response to the difference being less than the first threshold.

In other aspects, the method includes determining a weighted combination of a set of authentication decisions, including the first authentication decision, for each modality of the set of modalities. In other aspects, the method includes, in response to each authentication decision of the set of authentication decisions indicating the corresponding sensor data corresponds to the first user, performing the requested action. In other aspects, the method includes determining, for a predetermined training period, a set of verified values of the first user for each modality of the set of modalities.

A passive authentication system for a first user device includes at least one processor and a memory coupled to the at least one processor. The memory stores a distance database including a verified value of a first user for each modality of a set of modalities and instructions for execution by the at least one processor. The instructions include, in response to receiving a requested action, obtaining a set of sensor data and categorizing first sensor data of the set of sensor data into a first modality of the set of modalities. The instructions include, for the first modality of the set of modalities, determining a paired sample data by applying a first modality model to the first sensor data and comparing the paired sample data to the verified value of the first user stored in the distance database for the first modality. The instructions include, based on the comparison, determining a first authentication decision of the paired sample data. The instructions include, in response to the first authentication decision indicating the first sensor data corresponds to the first user, performing the requested action.

In other aspects, the instructions include, in response to the first authentication decision indicating the first sensor data does not correspond to the first user, requesting an additional authentication decision. In other aspects, the additional authentication decision includes requesting a password or biometric data. In other aspects, comparing the paired sample data to the verified value of the first user stored in the distance database for the first modality includes determining a distance between the paired sample data and the verified value of the first user stored in the distance database.

In other aspects, the instructions include obtaining a first threshold corresponding to the first modality and authenticating the set of sensor data as the first user in response to the distance being less than the first threshold. In other aspects, the instructions include, in response to the distance being greater than the first threshold, locking the first user device and denying performance of the requested action. The requested action is access to a vehicle or a ride share service.

In other aspects, the instructions include determining a set of authentication decisions, including the first authentication decision, for each modality of the set of modalities and, in response to each authentication decision of the set of authentication decisions indicating the corresponding sensor data corresponds to the first user, performing the requested action.

In other aspects, the first modality model includes two stacked Long Short-Term Memory architecture, wherein the two stacked Long Short-Term Memory architecture is pre-trained using a training dataset. In other aspects, the instructions include determining, for a predetermined training period, a set of verified values of the first user for each modality of the set of modalities.

In other aspects, the determining the set of verified values of the first user for each modality of the set of modalities includes obtaining a fine-tune dataset from a set of sensors for the predetermined training period, categorizing data of the fine-tune dataset according to the set of modalities, training each corresponding modality model using the corresponding categorized data, and determining the set of verified values of the first user for each modality of the set of modalities as an output of each corresponding modality model. In other aspects, the system includes a plurality of sensors. In other aspects, the set of sensor data is obtained from the plurality of sensors.

A passive authentication system for a first user device includes a plurality of sensors, at least one processor, and a memory coupled to the at least one processor. The memory stores a distance database including a verified value of a first user for each modality of a set of modalities, a threshold database including a threshold value for a weighted combination of the set of modalities, and instructions for execution by the at least one processor. The instructions include, in response to receiving a requested action, obtaining a set of sensor data from the plurality of sensors and categorizing first sensor data of the set of sensor data into a first modality of the set of modalities. The instructions include, for the first modality of the set of modalities, determining paired sample data by applying a first modality model to the first sensor data, obtaining a first verified value of the first user stored in the distance database for the first modality, and determining a distance between the paired sample data and the verified value. The instructions include obtaining a first threshold value stored in the threshold database for the first modality and, in response to the distance being less than the first threshold value, performing the requested action.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
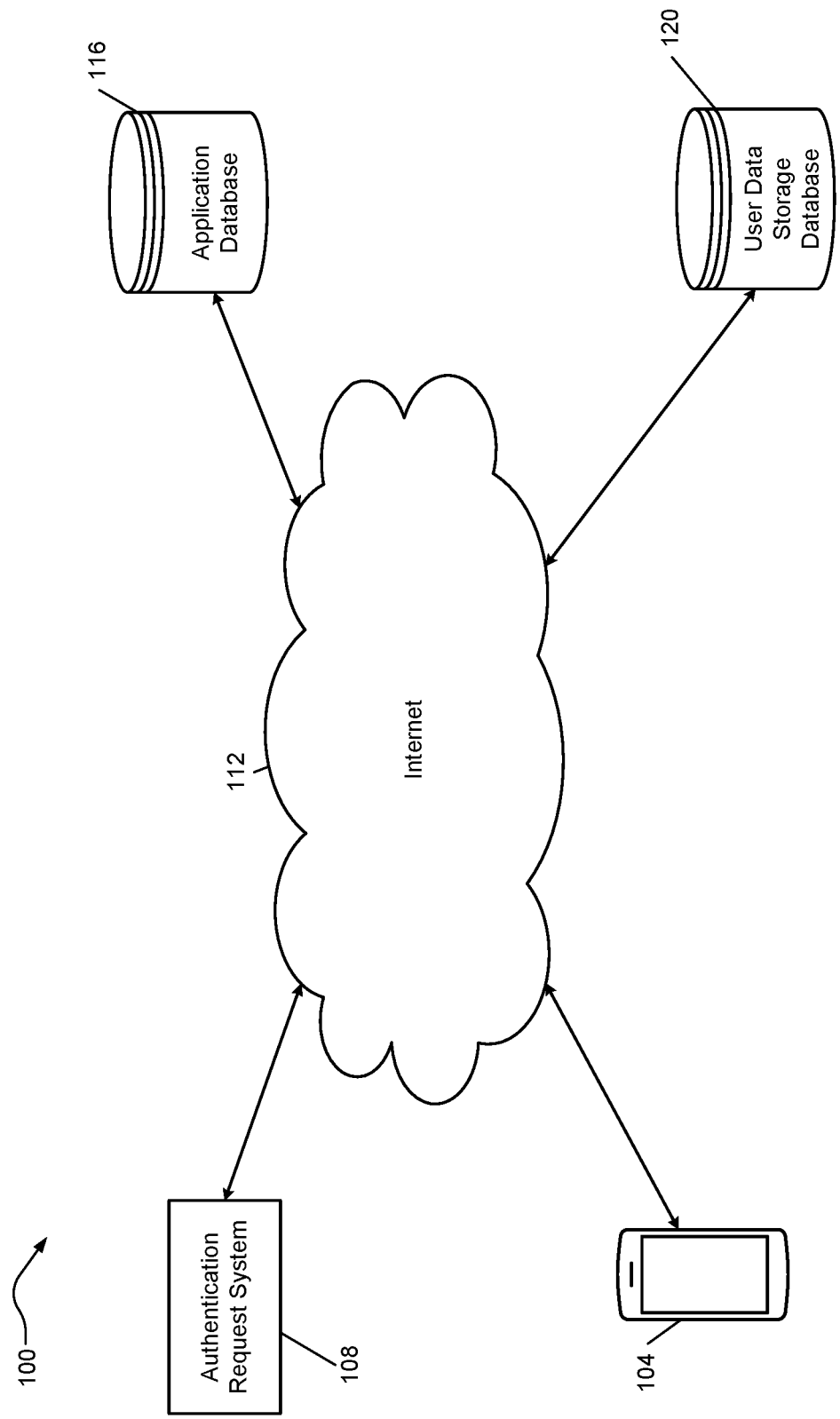
FIG. 1 a high-level example implementation of a passive authentication system according to principles of the present disclosure.

A passive authentication system authenticates a user by leveraging data from the user's existing device sensors to verify user identity. In various implementations, the passive authentication system is used to unobtrusively authenticate a user when the user is requesting a ride share service or unlocking their vehicle, for example, by pressing a button of a user device application or an unlock button on a vehicle or remote. The passive authentication system can identify behavioral trends or patterns of users operating user devices by leveraging data from existing user device sensors and training a Siamese Long Short-Term Memory (LSTM) machine learning model with a set of training data for each modality or sensor from a set of sensors on the user device.

The passive authentication system may be operated as an application on a user device. Upon download, the application may perform a brief data collection for a short training period to obtain personalized data regarding the true owner of the user device. In this way, once a request is issued, the user can be passively authenticated through the application.

The passive authentication system can automatically learn patterns of a particular user during a short training period that trains multiple modalities (that is, multiple types of sensor data) for the particular user. Then, upon user request to unlock a vehicle or request a ride service, the passive authentication system can authenticate the user during one of the requests, for example, by using a recent set of user collected data that is passively obtained during user operation of the user device. The passive authentication system may be implemented as a user device application that the user can download on their user device. After a minimal period of training the learning module (Siamese LSTM) for the particular user, the passive authentication application can collect and transmit a set of user device data from a set of sensors collected during a predetermined period, each sensor corresponding to a particular modality.

In various implementations, the passive authentication system may continuously authenticate the user while operating the passive authentication application. In other implementations, the passive authentication system may authenticate the user only in response to a ride request or an unlock request of a vehicle. Since the passive authentication system is continuously collecting sensor data, once a ride is requested or a vehicle unlock request is received, the passive authentication system can utilize the presently collected sensor data to verify the operator of the user device.

Current authentication schemes on mobile platforms require explicit user interaction with the user device, referred to as explicit authentication, in order to gain access to the user device. The entry point for the user device access is typically a passcode or a biometric cue such as face, fingerprints, iris, etc. Passwords and PINs have long been viewed as the pinnacle of securing information and controlling access to mobile devices. However, these knowledge-based authentication schemes are prone to social engineering hacks, guessing, over-the-shoulder attacks, etc.

With recent advances in technology, smartphones are getting better at authenticating users by learning their biometric traits, such as face, fingerprint, or iris, which are believed to be unique to individuals. These traits are regarded as more reliable than knowledge-based authentication schemes due to their uniqueness. On the downside, biometric authentication raises privacy concerns related to collecting biometric data. In addition, spoof attacks at the biometric sensor level, and possible theft of biometric templates stored inside the user device, are among the growing concerns related to biometric-based authentication.

Although the use of explicit authentication schemes is widespread, explicit authentication is both cumbersome and obtrusive as the user needs to actively focus on the authentication step before using the user device. Furthermore, users may prefer to set simple and weak passwords, increase the inactive period for lock-out time, or disable the authentication step completely. In addition, PIN codes, passwords, and biometric scans are well-suited for one-time authentication but are not effective in detecting intrusion after successful authentication by the genuine user when unlocking the phone.

Instead, the passive authentication system of the present disclosure tackles these challenges by providing an additional layer of security by frequently and unobtrusively monitoring the user's interaction with the user device. The passive authentication system does not require any explicit authentication step.

In various implementations, the passive authentication system may collect data from as many as 30 different sensors of a user device to passively authenticate users. Throughout this disclosure, eight modalities are specifically discussed, including keystroke dynamics from touchscreen sensor (key hold time, finger area, and finger pressure), GPS location, accelerometer, gyroscope gesture, magnetometer, gravity sensor, linear acceleration, and rotation sensor.

However, additional modalities may be included, such as application usage (name of the user device application being used), battery levels (percentage of battery charge left), Bluetooth connections (Bluetooth connection names around device), brightness levels (screen brightness level), cell tower connections (cell tower names around device), file read in/write out (files that were read from or written to user device's disk), glance gesture (user glanced at their user device), user's facial image from the camera, heart-rate sensor (user's heart-rate beats-per-minute), humidity sensor (ambient air humidity percentage), light sensor (ambient light measure), NFC connections (NFC connection names around device), orientation sensor (user device's orientation in X, Y, and Z planes), pickup gesture (user device was picked up), barometer (atmospheric pressure), screen touch sensor (touch location), step counter (number of steps walked), step detector (user is walking), temperature sensor (ambient temperature), tilt detector (device is tilted), volume levels (level of volume set by user), wake up gesture (user device is turned on), and WiFi connections (WiFi connection names).

The passive authentication system implements a Siamese LSTM architecture for extracting deep temporal features from training data corresponding to a number of passive sensors in user devices for user authentication.

Most of the passive authentication studies have focused on a single sensing modality for authentication. Authenticating a user on their user device based on a single biometric modality becomes very challenging when the authentication time window is short. In addition, given the task the user is engaged in, the amount of data and the availability of different sensor modalities fluctuates. A robust passive authentication scheme must be able to adapt to the high intra-user variability observed in human-smartphone or human-user device interaction using a multimodal approach to passive authentication using a plurality of user device sensors, as presented in the present disclosure.

Fusing decisions from multiple modalities to authenticate the user has been demonstrated to be very useful due to the reduced authentication accuracy of one or a few modalities. The majority of multimodal biometric systems fuse classifiers at the score level based on min, max, or sum rules. The passive authentication system adopts the sum of scores fusion technique, which has been shown to perform well in multimodal biometric systems compared to other fusion schemes. The passive authentication system implements a Siamese LSTM network to address temporal dependencies.

Referring to FIG. 1, a high-level example implementation of a passive authentication system 100 is shown. The passive authentication system 100 authenticates a user or owner of a user device 104, such as a smartphone or other mobile computing device. The user device 104 can verify the user's identity for an authentication request system 108 via the Internet 112. For example, the authentication request system 108 can be a ride share service that requests user authentication in response to a ride request, a vehicle control unit that requests user authentication in response to receiving an unlock request or other vehicle operation requests, etc.

The passive authentication system 100 includes an application database 116 and a user data storage database 120. The application database 116 stores a passive authentication application with pre-trained authentication models for a set of modalities trained using training sensor data or training dataset.

The user may download on the user device 104 the passive authentication application from the application database 116 with pre-trained models. After download, the passive authentication application can instruct the user through a variety of screen prompts to update or adjust the pre-trained models according to unique use of the user device 104 by the user. Once trained for the particular user, the passive authentication application collects sensor data from a plurality of sensors existing on the user device 104, as shown in more detail in FIG. 2, and operates to authenticate the user continuously or in response to a particular prompt from the authentication request system 108.

The user data storage database 120 stores a variety of user data collected by the passive authentication module on the user device 104. The passive authentication module uploads the collected data to the user data storage database 120 via the Internet 112 at predetermined intervals. In various implementations, the user data storage database 120 is excluded from the passive authentication system 100 and only a subset of sensor data is collected and stored on the user device 104 for a predetermined period. Additionally, in other implementations, the passive authentication system 100 may store the pre-trained models on a server remote from the user device 104, resulting in the passive authentication application authenticating users at the remote server, after receiving a set of authentication data via the Internet 108, and forwarding the authentication data to the authentication request system 108.

In an off-line phase, the pre-trained models are trained for each modality. During deployment, the incoming data from the user device sensor modalities are continuously monitored. If the incoming data successfully passes the authentication criteria, a decision is made that the present user is indeed the legitimate owner of the user device. Otherwise, the passive authentication system 100 locks out the user from the user device and offers an explicit authentication method such as a password or biometrics such as fingerprint scans.

In an example implementation, a training dataset to pre-train authentication models for each modality may consist of measurements from as many as 30 sensors currently present in most commonly used user devices for a set of users, for example a set of 30 or more users. Data for each user may be collected over a period of 15 days. To continuously collect data, the passive authentication application automatically turns on whenever the user device boots up and continuously runs in the background while passively recording sensor data. In order to collect keystroke dynamics, a custom soft-keyboard may be downloaded from the application database 116. The custom soft-keyboard may also be implemented as part of the targeted application, such as the ride-request or ride-sharing application.

The passive authentication system 100 has the advantage that user interaction with a data collection application is not required, enabling users to use their user devices as they generally would in their everyday lives. Data for the modalities may be acquired continuously, even when the user is not actively interacting with their user device.

Figure 2:
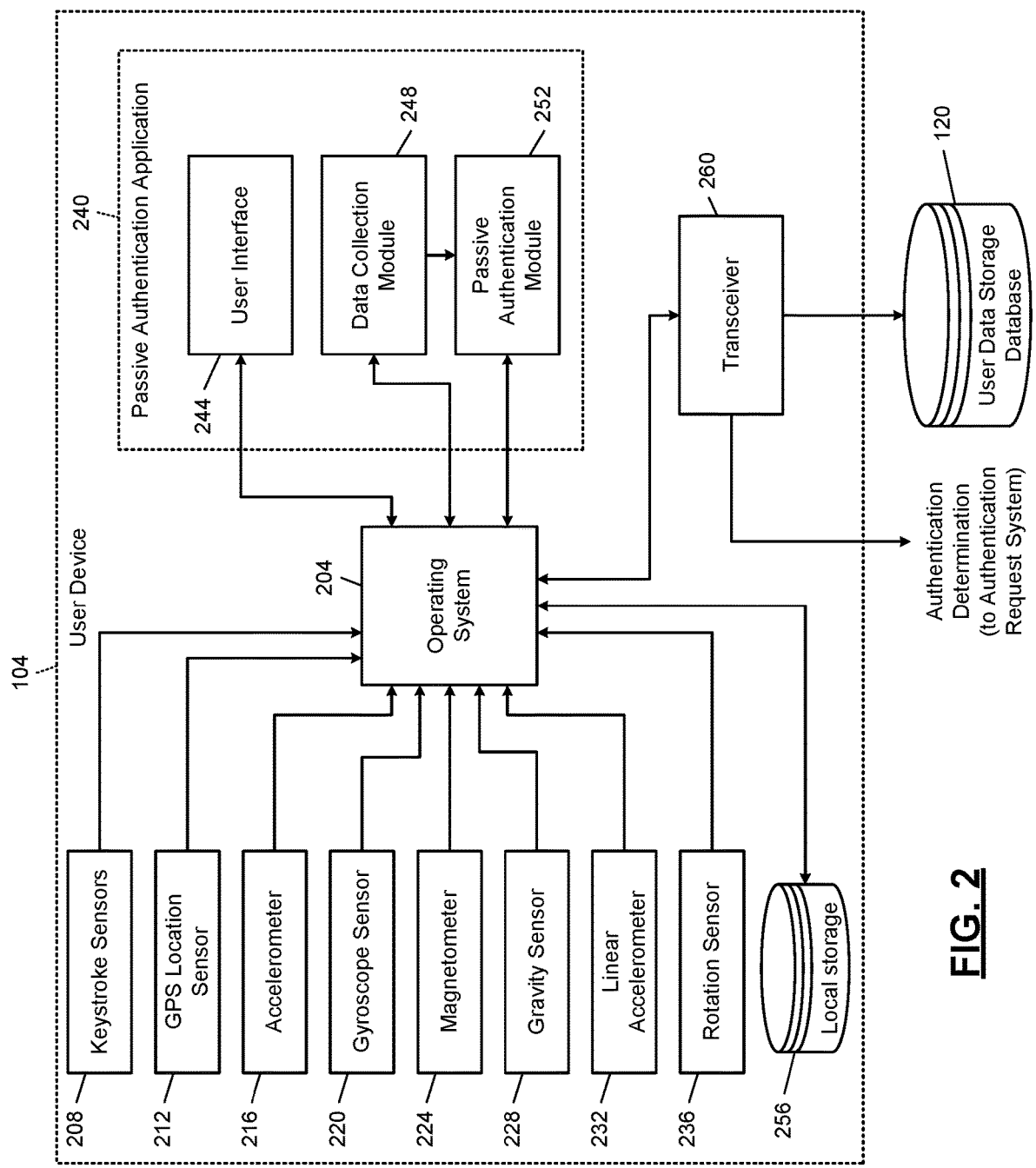
FIG. 2 is a functional block diagram depicting an example user device.

Referring now to FIG. 2, a functional block diagram depicting an example user device 104 is shown. The user device 104 includes an operating system 204 and a plurality of sensors. The plurality of sensors include keystroke sensors 208, a GPS location sensor 212, an accelerometer 216, a gyroscope sensor 220, a magnetometer 224, a gravity sensor 228, a linear accelerometer 232, and a rotation sensor 236. As described above, the plurality of sensors is not limited to the sensors shown in FIG. 2.

The keystroke sensors 208 may determine key hold time, finger area, and finger pressure. The GPS location sensor 212 may determine the user's GPS location, including latitude and longitude. The accelerometer 216 may determine an acceleration of the user device in X, Y, and Z planes. The gyroscope sensor 220 may determine a rate of rotation of the user device in X, Y, and Z planes. The magnetometer 224 may determine the Earth's magnetic field in X, Y, and Z planes. The gravity sensor 228 may determine a direction and magnitude of gravity. The linear accelerometer 232 may determine a linear acceleration in X, Y, and Z planes. The rotation sensor 236 may determine a rotation of the user device in X, Y, and Z planes.

As previously mentioned, the plurality of sensors are presently available in all smartphones and smartwatches, allowing a passive authentication application 240 to collect sensor data without requiring installation of additional sensor hardware. The passive authentication application 240 includes a unique user interface 244, a data collection module 248, and a passive authentication module 252. The user interface 244 provides prompts for particular data collection to update the pre-trained models of the passive authentication module 252 according to the unique use of the user device 104 by the user.

In various implementations, the passive authentication module 252 receives data directly from the data collection module 248 for authentication. Additionally or alternatively, the passive authentication module 252 receives data for authentication from a local storage 256 via the operating system 204 or the user data storage database 120 via the operating system 204 and a transceiver 260.

The data collection module 248 receives sensor data from the plurality of sensors via the operating system 204. The data collection module 248 directs the collection of sensor data and updates the local storage 256 via the operating system 204 with a set of collected data for a plurality of modalities over a predetermined period. For each set of data collected by the data collection module 248 for the predetermined period of time, the data collection module 248 may replace the previously stored set of data included in the local storage 256. In various implementations, the local storage 256 may store data for a set of time, for example, the last 24 hours. In other implementations, sensor data for a plurality of user devices may be stored remotely in the user data storage database 120 via the transceiver 260 of the user device 104.

The keystroke sensors 208 operate by modeling the user's typing rhythms and mannerisms, which can be used for authenticating user device users. The data collection module 248 can collect and record the finger pressure, finger area, and hold time whenever a user types a character on their user device 104. The exact characters typed are not logged and therefore, the keystroke patterns collected are non-invasive in nature.

For the user of the user device, the data collection module 248 collects and records from the GPS location sensor 212 a pair of latitude and longitude coordinates whenever the user device 104 is moved. Location is considered as a measure of an individual's characteristic and, therefore, distinguishable patterns can be found in a user's everyday location.

The passive authentication application 240 also accounts for movement. The data collection module 248 collect and records movement using the six additional sensors (accelerometer 216, gyroscope sensor 220, magnetometer 224, gravity sensor 228, linear accelerometer 232, and rotation sensor 236). Measurements are recorded in three axes, X, Y, and Z, for all six sensors. Intra-user chronological gaps in measurements may be present due to the high-variability in user's behavior, for instance, they may switch off their user device, or the user device may shut off due to battery drain. These gaps are accounted for by generated models using LSTM architecture.

Two approaches to passive authentication may be implemented: (i) an on-line approach and (ii) an off-line approach (as mentioned previously). The on-line approach trains an authentication model using samples pertaining to the user for a certain period of time before deploying the model. A major limitation to on-line approach involves training an individual model for each user. As a consequence, it is challenging to accurately evaluate the overall authentication performance across all the users due to high variance. In addition, the required amount of data, the duration of data collection before model deployment, and privacy concerns of storing the training data are ongoing challenges.

Off-line approaches, on the other hand, train a common authentication model that learns salient representations for individual modalities. In this approach, the same trained model is deployed when users install the application. Moreover, the users can avail of the authentication mechanism immediately after the installation of the application.

The passive authentication application 240 can implement a combination of the two approaches, employing an off-line learning strategy for passive authentication that has a fine-tune phase after the passive authentication application 240 is downloaded to the user device 104. During the fine-tune phase, the passive authentication application 240 prompts the user via the user interface 244 to follow a set of use directions to accurately update the pre-trained models according to the way the precise manner the user uses or handles the user device 104.

Prior to download, for each of the eight modalities, a Siamese LSTM network is trained to learn deep temporal features. Training samples from users are transformed into an embedding space learned by the Siamese network. Therefore, during deployment, only the features extracted from the incoming data are required for authentication, thereby, eliminating the need to store private data on each user device. The pre-trained models for each modality may then be personalized or customized according to the user downloading the passive authentication application (for example, the owner of the user device). In various implementations, the passive authentication application may have a variety of accounts for multiple users of the user device, allowing the user device to personalize models for each user and authenticate each user.

Figure 3:
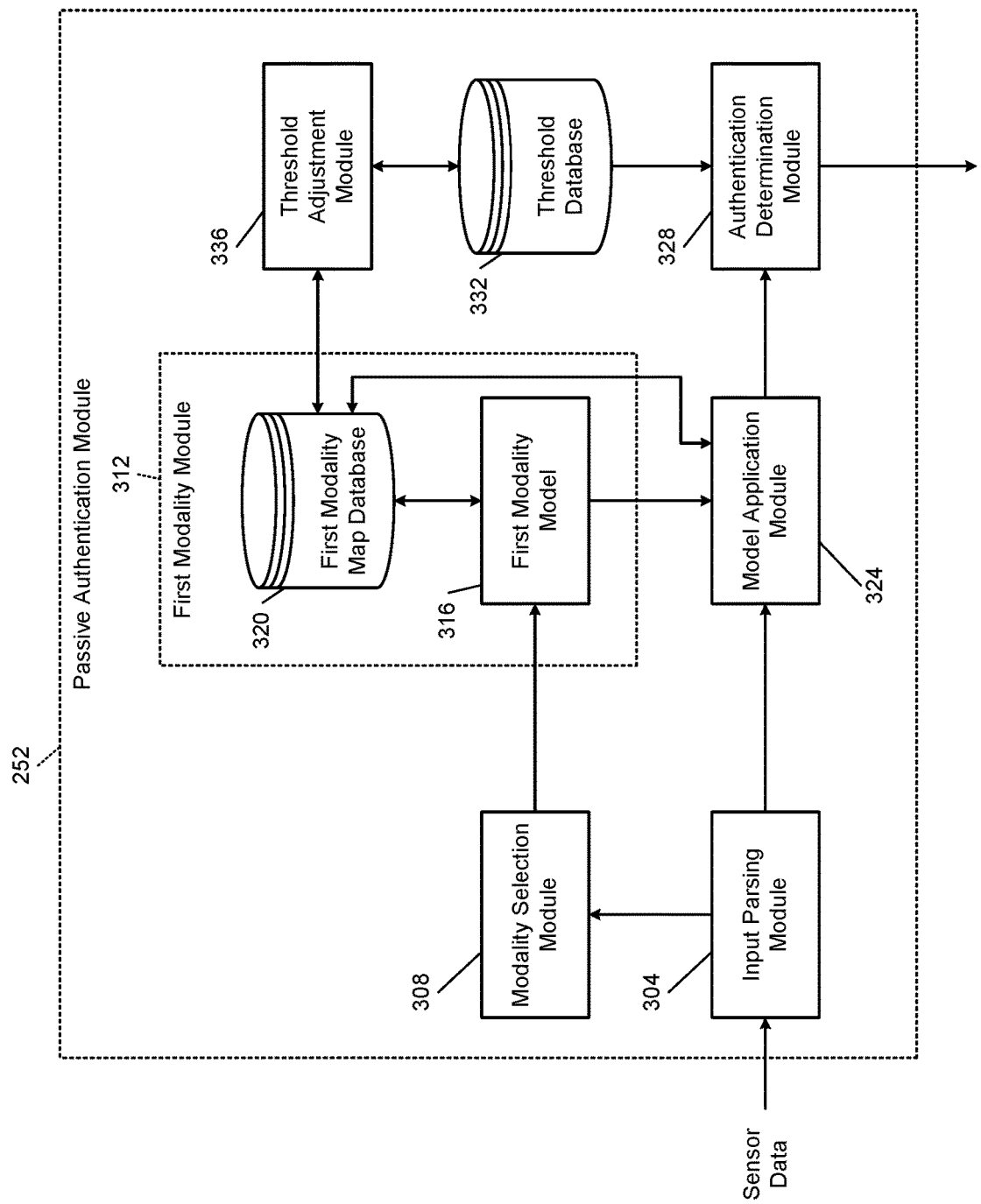
FIG. 3 is a functional block diagram of an example implementation of a passive authentication module.

Referring now to FIG. 3, a functional block diagram of an example implementation of the passive authentication module 252 is shown. As mentioned previously, the passive authentication module 252 may receive sensor data to authenticate from local storage of a user device or the passive authentication application on the user device. In various implementations, the passive authentication module 252 receives sensor data to authenticate from a remote storage location.

An input parsing module 304 receives the sensor data for personalization training or authentication. As previously described, once the passive authentication application is downloaded on a user device, the passive authentication application may update the pre-trained models of the passive authentication module 252 according to specific use of the user. The passive authentication application may guide the user through a series of actions to personalize the pre-models for each modality.

If the input parsing module 304 determines that the user data is for training or fine-tuning the models, the sensor data is forwarded to a modality selection module 308. As previously indicated, a model is generated (using a training dataset and updated for each user) for each modality (for example, keystroke, location, etc.). The passive authentication module 252 depicts only a first modality; however, as described, the passive authentication module 252 would implement and combine, for example, eight different modalities and may use a fewer number or greater number of modalities.

The modality selection module 308 separates out each modality of the sensor data and forwards the sensor data to the corresponding modality module, for example, a first modality module 312 (for example, keystroke). In addition, depending on the user's preference in regards to privacy, the user may opt out of being authenticated via certain modalities. The modality selection module aids in maintaining high authentication accuracy by selecting the best combinations of all available modalities, given the user preferences.

The first modality module 312 includes a first modality model 316 that implements an LSTM architecture to generate the first modality model 316 according to the sensor data of the user in order to personalize the model (fine-tune phase). The first modality model 316 is pre-trained by a set of training data to learn to identify or authenticate users by classifying and determining a distance value of incoming sensor data. For example, the first modality model 316 can analyze sensor data inputs and calculate a distance value of each input to represent the verified user during the fine-tune phase. Then, during authentication, based on a distance (for example a difference) between presently analyzed sensor data and the previous distance values of the verified user, the user may be authenticated. For example, if the distance exceeds a threshold, then the user is not authenticated. In various implementations, a first modality map database 320 may be included in the first modality module 312 to store verified distance values of the user of the user device.

After the first modality module 312 has been implemented to determine representations of the user, the passive authentication module 252 may be used to authenticate the user. When an authentication request is received, a most recent set of sensor data is forwarded to the passive authentication module 252 for authentication. The input parsing module 304 determines, based on the sensor data input including an indication that an authentication request has been received, that the sensor data is being forwarded for authentication. Then, the sensor data is forwarded to a model application module 324 of the passive authentication module 252. The model application module 324 obtains and applies the first modality model 316 to the sensor data to classify and determine a distance value of the sensor data. In various implementations, the sensor data may be forwarded directly to the first modality model 316 to classify the sensor data.

The model application module 324 may also compare known stored user distance data (stored in the first modality map database 320) to the presently received sensor data. Then, a similarity or a distance between the known, mapped distances of the first modality map database 320 of the true user and the determined distance of the sensor data is forwarded to an authentication determination module 328 for comparison. The authentication determination module 328 may include a predetermined threshold or access an optionally dynamic threshold database 332 to compare a present distance between the known distance of the true user and the determined distance of the sensor data to a dynamic threshold value.

If the threshold is dynamic, each authentication being performed is incorporated into the first modality model 316 and the corresponding threshold is adjusted by a threshold adjustment module 336 according to the continuously updated first modality map database 320. As long as the determined distance of the sensor data does not exceed the threshold, the user is authenticated. However, if the distance exceeds the threshold, the user cannot be authenticated and other authentication schemes, such as passwords or biometric scans of face or fingerprint, can be presented to the user for explicit authentication.

The determination is forwarded to the user interface of the passive authentication application as well as the authentication request system to perform the requested function (such as unlock or request a ride). In various implementations, each authentication request can update the threshold according to an average distance or position of the authenticated user. Additionally or alternatively, each authentication can also update the first modality model 312. Each modality model is applied to corresponding sensor data and a difference between sensor data and known user data is forwarded to the authentication determination module 328 for each modality. In various implementations, each modality module has a separately determined threshold and, for the user to be authenticated, each modality for which sensor data is obtained must be verified or exceed the corresponding threshold. Alternatively, a subset of modalities may need to be verified or at least the corresponding difference must be within a predetermined range of the threshold.

Figure 4:
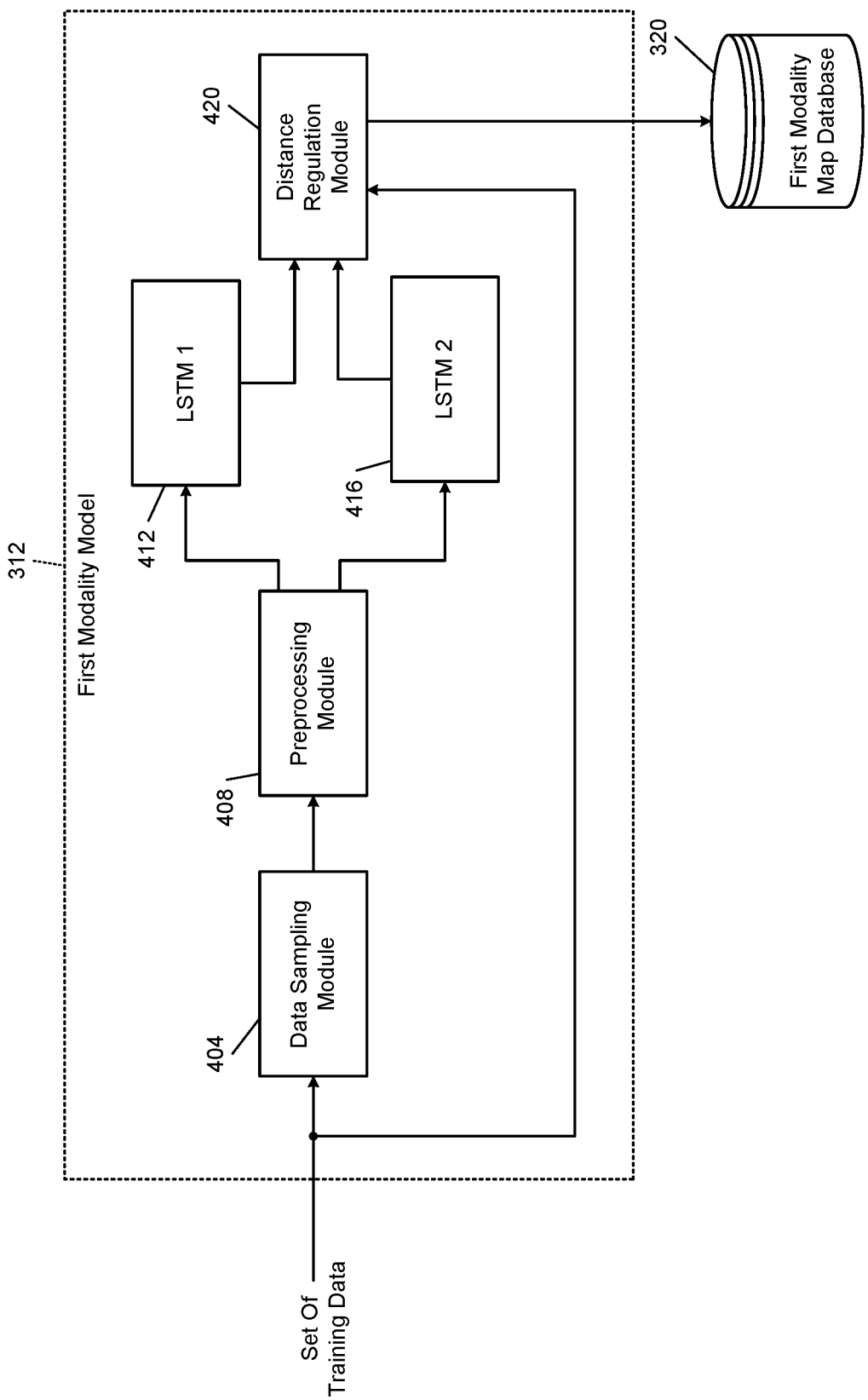
FIG. 4 is a functional block diagram depicting training of a modality model of a passive authentication system.

Referring to FIG. 4, a functional block diagram depicting training of a modality model is shown. The first modality model 312 receives a set of training data at a data sampling module 404. Included in the set of training data is an indication whether each pair of the set of training data submitted to the first modality model 312 is a matching pair (the same user) or different users.

Suppose that we extract a D dimensional data sample for a given sensor modality (for instance, accelerometer has data in 3 axes, namely X, Y, and Z). The number of samples for each user can vary. The set of training data may be segmented by the data sampling module 404 by moving a window of fixed size T (authentication time window) over the sequential data with a pre-defined shift of T-shift and build overlapping fixed-sized segments. Therefore, for each user, a set of D×T segments is included in the set of training data. These segments are then passed to the preprocessing module. A pair of the segments (two inputs) are forwarded to a preprocessing module 408.

The outputs of the sampling module contain measurements from a modality in their original domain, namely the time domain. The frequency domain can handle and remove noise, while also retaining the discriminating patterns in the data within sequential data. The preprocessing module 408 maps the measurements from the time domain to frequency domain only for the movement sensors, i.e. accelerometer, gyroscope, magnetometer, linear accelerometer, gravity, and rotation. Fast Fourier Transform (FFT) is used to convert time domain signals on each feature dimension to frequency domain signals. The output of the FFT vectors are concatenated with samples in the time domain to use information from both the domains. Then, a first data sample of the pair is forwarded to a first LSTM 412 and a second data sample of the pair is forwarded to a second LSTM 416.

The passive authentication module intends to obtain highly discriminative features for each modality that can distinguish samples from genuine and impostor users using guided learning. In other words, the passive authentication module would like to learn information-rich transformation of the data from modalities into an embedding space that can preserve distance relation between training samples.

Suppose a pair of input samples, $(X_i, X_j)$, are input into the first modality model 312. Let $y_{ij}$ be a label included in the training dataset that is forwarded to a distance regulation module 420, such that, $y_{ij}=0$, if $X_i$ and $X_j$ belong to the same user, and $y_{ij}=1$, otherwise. The input samples are mapped to an embedding space (stored, for example, in the first modality map database 320) where two samples from the same user are closer together and two samples from different users are far apart. A Siamese network architecture (the first LSTM 412 and the second LSTM 416), which is a neural network architecture comprising of two identical sub-networks, is well-suited for such verification tasks. In this manner, relationships between two input samples can be learned. In a Siamese network, weights between the two sub-networks are shared and the weights are updated based on the label, $y_{ij}$. A Siamese Convolutional Neural Network (CNN) was previously proposed for passive authentication; however, CNNs are not well-suited to capture the temporal dependence within samples.

Instead, LSTM, a variant of Recurrent Neural Networks (RNN), is designed for classifying, processing, and making predictions on time series data. In the passive authentication module, two LSTMs are stacked for each modality model in order to learn hierarchical representation of the time series data. The first LSTM 412 outputs a sequence of vectors, $h_1^1, \ldots, h_T^1$ which are then fed as input to the second LSTM 416. The last hidden state, $h_T^2$, of the second LSTM 416 represents the final non-linear embedding, denoted by $f_\theta(\bullet)$, where $\theta$ represents the parameters of the Siamese LSTM network. This hierarchy of hidden layers allows for more salient representation of the time-series data. In order to train the Siamese LSTM network, a pairwise contrastive loss function is defined and implemented in the distance regulation module 420.

For a given pair of input samples, the Euclidean distance between the two output feature vectors from the two sub-networks are fed to the distance regulation module 420, which also receives the label indicating whether the two inputs are from the same user or different users, and applies the contrastive loss function. This loss function regulates large or small distances depending on the label associated with the pair of samples, $y_{ij}$. In this manner, the Euclidean distance between the pairs, $d_\theta(X_i, X_j)$, where, $d_\theta(X_i, X_j)=\|f_\theta(X_i)-f_\theta(X_j)\|_2$, is small for genuine pairs and large for impostor pairs. The contrastive loss function is defined as: $l_\theta=\Sigma_{i,j=1}^N L_\theta(X_i, X_j, y_{ij})$, where $L_\theta=(1-y_{ij})1/2(d_\theta)^2+(y_{ij})1/2\{\max(0, \alpha-d_\theta)\}^2$ where, $\alpha>0$ is called the margin. The distance regulation module 420 may store known distances in the first modality map database 320 and accessed for comparison to present sensor data for authentication, as described in FIG. 3.

Figure 5:
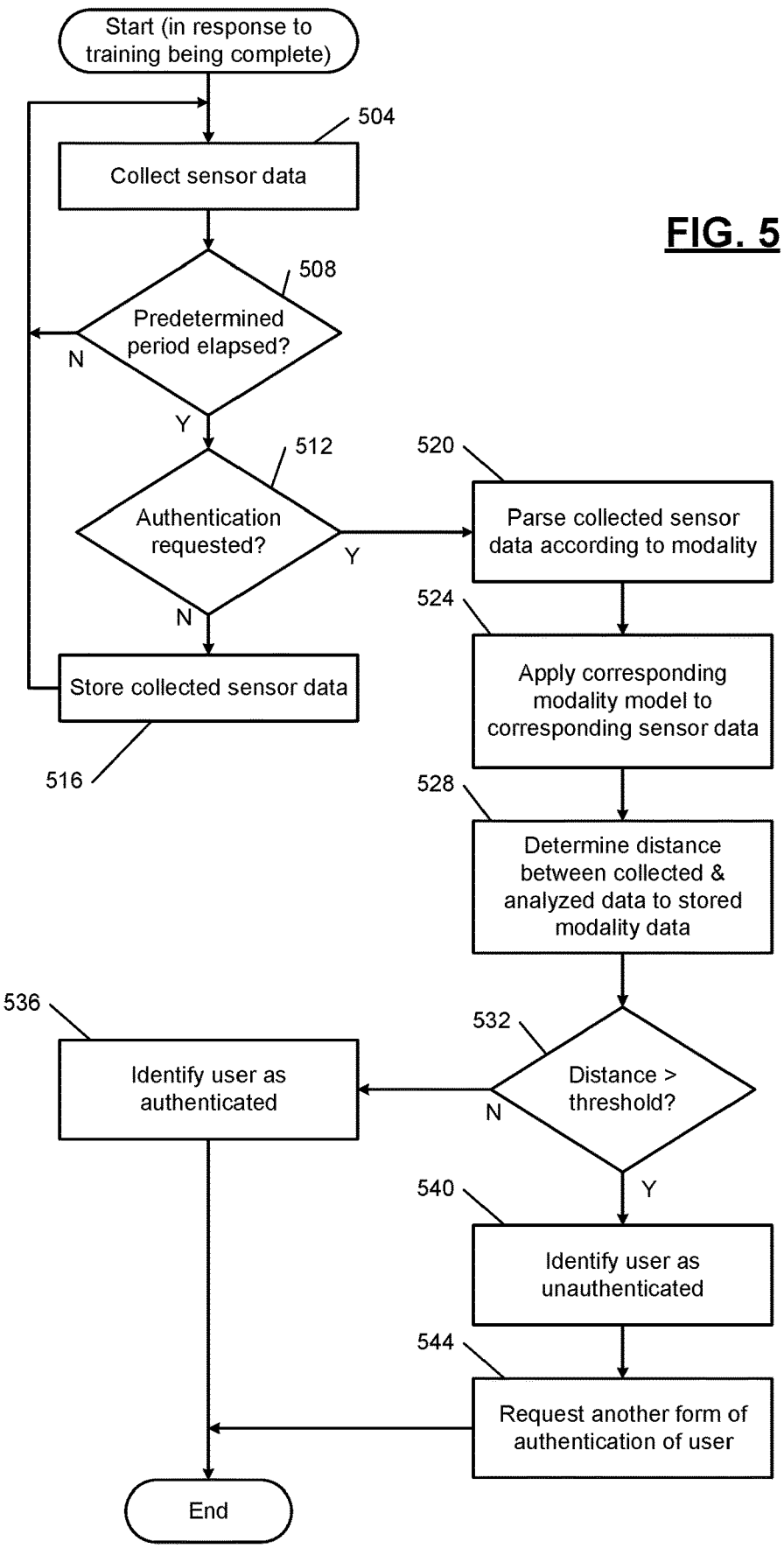
FIG. 5 is a flowchart depicting example authentication of a user through a passive authentication application.

Referring to FIG. 5, a flowchart depicting example authentication of a user through a passive authentication application is shown. Control begins in response to training of a passive authentication application being completed. At 504, control collects sensor data. Control proceeds to 508 to determine if a predetermined period has elapsed. If no, control returns to 504 to continue to collect sensor data. Otherwise, control proceeds to 512 to determine if authentication has been requested. For example, authentication may be requested in response to a user requesting a ride or a user requesting a vehicle be unlocked or engine of a vehicle be started.

If authentication has not been requested, control continues to 516 to store collected sensor data. As previously described, the sensor data that is collected for the predetermined period may be stored locally, on the user device or within the passive authentication application, or remotely on a server. Once the collected data is stored, control returns to 504 to collect another set of data. In various implementations, at 516, the collected sensor data replaces the previously stored sensor data.

Returning to 512, if authentication is requested, control proceeds to 520 to parse the collected sensor data and sort the data according to modality, for example, whether the data is used for keystroke determination or location determination. Then, control continues to 524 to apply the corresponding modality model to each corresponding portion of the sensor data to identify, using the trained modality models, whether the sensor data is authenticated as the user or not.

Control continues to 528 to determine a distance or a difference between the collected and analyzed data to the stored modality data. Control continues to 532 to determine whether the distance is greater than a predetermined threshold. If no, control proceeds to 536 to identify the user as authenticated. Then, control ends. Otherwise, control proceeds to 540 to identify the user as unauthenticated. Then, control proceeds to 544 to request another form of authentication of the user.

For example, the additional form of authentication may be explicit authentication such as a password, PIN, biometric data, etc. on the user device or at the vehicle after the ride request is confirmed or the vehicle is unlocked. In various implementations, if the user is not authenticated, control may request explicit authentication at the user device in order to perform the request (for example, a ride or unlocking a vehicle) and a further form, at the ride or vehicle, of authentication may be requested to enhance security. Then, control ends.

Figure 6:
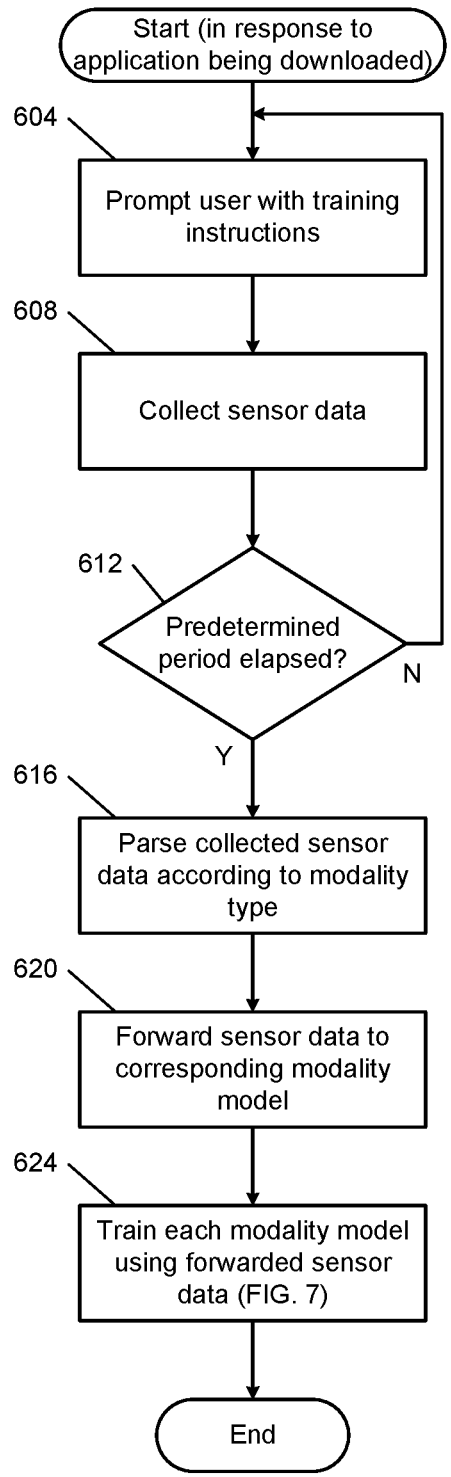
FIG. 6 is a flowchart depicting example training for a particular user of a passive authentication application.

Referring to FIG. 6, a flowchart depicting example fine-tuning (training) for a particular user of a passive authentication application is shown. Control begins in response to the passive authentication application being downloaded. Control proceeds to 604 to prompt a user via a user interface of a user device with training instructions. For example, the training instructions may include directions for movement or use of the user device for a short and/or predetermined period of time. Control continues to 608 to collect sensor data from a plurality of sensors of the user device. Then, control proceeds to 612 to determine if a predetermined period has elapsed. If no, then control returns to 604 to continue to prompt the user with training instructions for the predetermined training period. Otherwise, control proceeds to 616 to parse the collected sensor data according to modality type. Then, control continues to 620 to forward the parsed sensor data to corresponding modality models, trained to identify whether present sensor data is the verified owner of the user device. At 624, control trains each modality model using the sensor data collected during training, described in more detail in FIG. 7.

Figure 7:
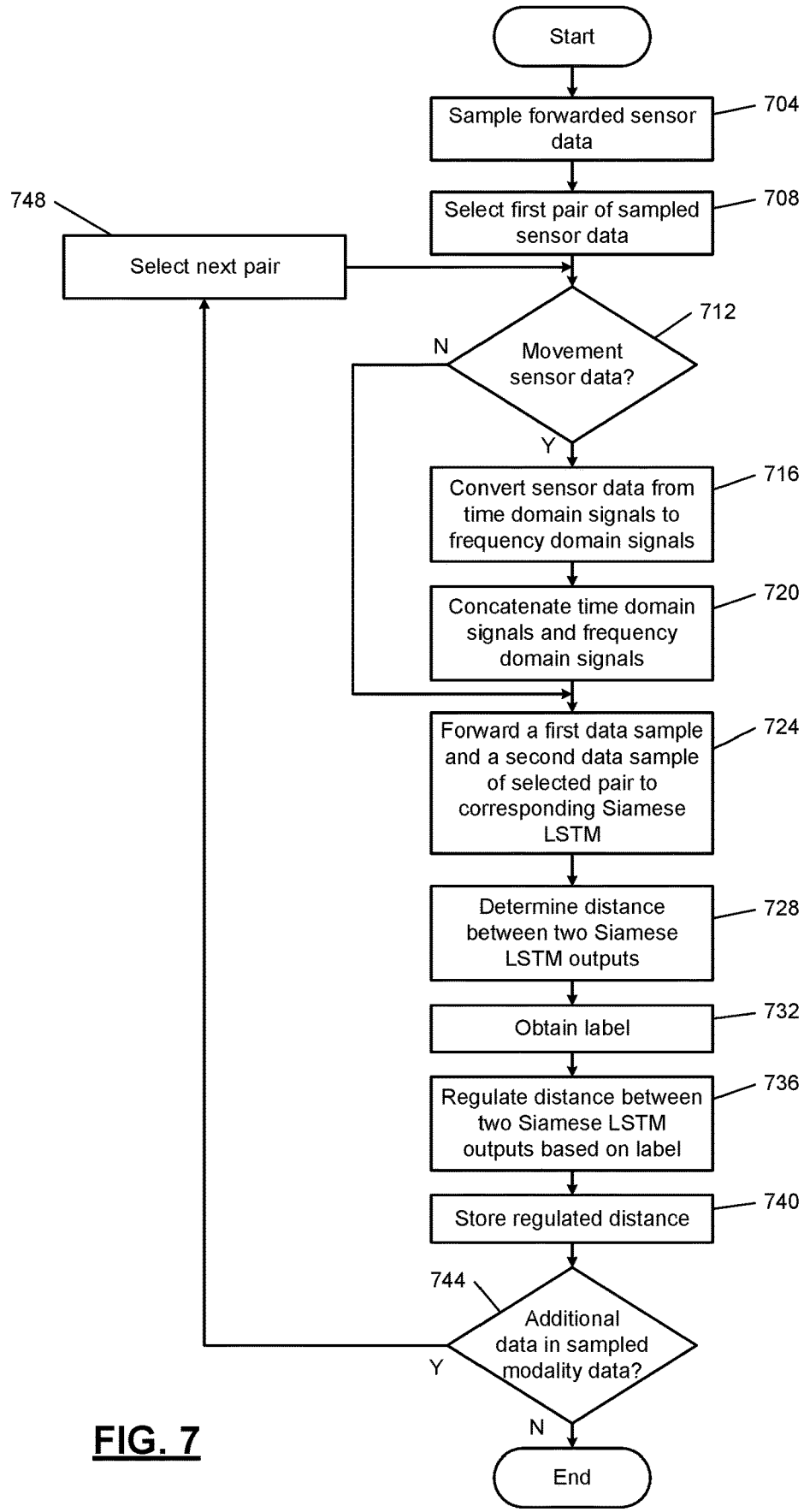
FIG. 7 is a flowchart depicting example updating of a modality model of a passive authentication application.

Referring to FIG. 7, a flowchart depicting example training of a modality model of a passive authentication application is shown. Control begins at 704 to sample forwarded sensor data. Control continues to 708 to select a first pair of sampled sensor data. Then, control continues to 712 to determine if the first pair of sampled sensor data includes movement data, for example, accelerometer sensor data. If yes, control continues to 716 to convert sensor data from time domain signals to frequency domain signals.

Control then continues to 720 to concatenate the time domain signals and converted frequency domain signals and proceeds to 724. Returning to 712, if the sensor data does not include movement sensor data, then control proceeds to 724. At 724, control forwards a first input data and a second input data of the selected pair to a set of two stacked Siamese LSTM architectures. Control continues to 728 to determine a distance between the outputs of the two Siamese LSTM architectures. At 732, control obtains a label included in the original forwarded sensor data, indicating, if this is training data, whether the data is from the same user or different users.

At 736, control regulates the distance between the two Siamese LSTM outputs based on the label; that is, control ensures that the distance is smaller if the two original inputs are from the same user and ensures the distance is larger if the two original inputs are from different users. This approach is also used for pre-training of the models. Then, control proceeds to 740 to store the regulated distance. At 744, control determines whether additional data is included in the sampled sensor data. If no, control ends. If yes, control proceeds to 748 to select a next pair and returns to 712 for additional processing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. While various embodiments have been disclosed, other variations may be employed. All of the components and function may be interchanged in various combinations. It is intended by the following claims to cover these and any other departures from the disclosed embodiments which fall within the true spirit of this invention.

What is claimed is:

1. A passive authentication method comprising:
   in response to receiving a requested action from a first user:
     obtaining a set of sensor data;
     categorizing first sensor data of the set of sensor data into a first modality of a set of modalities;
     for the first modality of the set of modalities:
       determining a distance value of the first sensor data by applying a first modality model to the first sensor data;
       comparing the distance value to a first verified value of the first user for the first modality; and
       in response to a first authentication decision indicating the first sensor data corresponds to the first user, performing the requested action;
     determining, for a predetermined training period, a set of verified values of the first user for each modality of the set of modalities by,
       obtaining a fine-tune dataset from a set of sensors for the predetermined training period;
       categorizing data of the fine-tune dataset according to the set of modalities;
       training each corresponding modality model using the corresponding categorized data; and
       determining the set of verified values of the first user for each modality of the set of modalities as an output of each corresponding modality model.

2. The passive authentication method of claim 1 further comprising:
   in response to the first authentication decision indicating the first sensor data does not correspond to the first user, requesting an additional authentication decision.

3. The passive authentication method of claim 2 wherein the additional authentication decision includes requesting a password or biometric data.

4. The passive authentication method of claim 1 further comprising:
   obtaining a first threshold corresponding to the first modality; and
   authenticating the set of sensor data as the first user in response to a difference being less than the first threshold.

5. The passive authentication method of claim 1 further comprising:
   determining a weighted combination of a set of authentication decisions, including the first authentication decision, for each modality of the set of modalities; and
   in response to each authentication decision of the set of authentication decisions indicating the corresponding sensor data corresponds to the first user, performing the requested action.

6. The passive authentication method of claim 1, wherein the first verified value of the first user for the first modality is stored in a distance database, the distance database includes a corresponding verified value of the first user for each modality of the set of modalities based on comparing, and determining a first authentication decision of the data distance value.

7. A passive authentication system for a first user device comprising:
   at least one processor; and
   a memory coupled to the at least one processor,
   wherein the memory stores:
     a distance database including a verified value of a first user for each modality of a set of modalities; and instructions for execution by the at least one processor and wherein the instructions include, in response to receiving a requested action:
obtaining a set of sensor data;
categorizing first sensor data of the set of sensor data into a first modality of the set of modalities;
for the first modality of the set of modalities:
determining a paired sample data by applying a first modality model to the first sensor data;
comparing the paired sample data to the verified value of the first user stored in the distance database for the first
based on comparing, determining a first authentication decision of the paired sample data; and
in response to the first authentication decision indicating the first sensor data corresponds to the first user, performing the requested action;
determining, for a predetermined training period, a set of verified values of the first user for each modality of the set of modalities by,
obtaining a fine-tune dataset from a set of sensors for the predetermined training period;
categorizing data of the fine-tune dataset according to the set of modalities;
training each corresponding modality model using the corresponding categorized data; and
determining the set of verified values of the first user for each modality of the set of modalities as an output of each corresponding modality model.

8. The passive authentication system of claim 7 wherein the instructions include:
in response to the first authentication decision indicating the first sensor data does not correspond to the first user, requesting an additional authentication decision.

9. The passive authentication system of claim 8 wherein the additional authentication decision includes requesting a password or biometric data.

10. The passive authentication system of claim 7 wherein the instructions include:
obtaining a first threshold corresponding to the first modality; and
authenticating the set of sensor data as the first user in response to the distance being less than the first threshold.

11. The passive authentication system of claim 10 wherein the instructions include, in response to the distance being greater than the first threshold:
locking the first user device, and
denying performance of the requested action, wherein the requested action is access to a vehicle or a ride share service.

12. The passive authentication system of claim 7 wherein the instructions include:
determining a set of authentication decisions, including the first authentication decision, for each modality of the set of modalities; and
in response to each authentication decision of the set of authentication decisions indicating the corresponding sensor data corresponds to the first user, performing the requested action.

13. The passive authentication system of claim 7 wherein the first modality model includes two stacked Long Short-Term Memory architecture, wherein the two stacked Long Short-Term Memory architecture is pre-trained using a training dataset.

14. The passive authentication system of claim 7 further comprising a plurality of sensors, wherein the set of sensor data is obtained from the plurality of sensors.

15. The passive authentication system of claim 7, wherein comparing the paired sample data comprises comparing the paired sample data to the verified value of the first user stored in the distance database for the first modality by determining a vector data distance between the paired sample data and the verified value of the first user stored in the distance database.

16. A passive authentication system for a first user device comprising:
a plurality of sensors;
at least one processor; and
a memory coupled to the at least one processor,
wherein the memory stores:
a distance database including a verified value of a first user for each modality of a set of modalities;
a threshold database including a threshold value for a weighted combination of the set of modalities; and
instructions for execution by the at least one processor and
wherein the instructions include, in response to receiving a requested action:
obtaining a set of sensor data from the plurality of sensors;
categorizing first sensor data of the set of sensor data into a first modality of the set of modalities;
for the first modality of the set of modalities:
determining paired sample data by applying a first modality model to the first sensor data;
obtaining a first verified value of the first user stored in the distance database for the first modality;
determining a distance between the paired sample data and the verified value;
obtaining a first threshold value stored in the threshold database for the first modality; and
in response to the distance being less than the first threshold value, performing the requested action;
determining, for a predetermined training period, a set of verified values of the first user for each modality of the set of modalities by,
obtaining a fine-tune dataset from a set of sensors for the predetermined training period;
categorizing data of the fine-tune dataset according to the set of modalities;
training each corresponding modality model using the corresponding categorized data; and
determining the set of verified values of the first user for each modality of the set of modalities as an output of each corresponding modality model.

* * * * *